United States Patent
Seshimo

(10) Patent No.: US 6,805,424 B2
(45) Date of Patent: Oct. 19, 2004

(54) METHOD OF CONTROLLING CARRYING OF RECORDING PAPER, RECORDING APPARATUS, AND RECORDING METHOD

(75) Inventor: Tatsuya Seshimo, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 177 days.

(21) Appl. No.: 10/288,564

(22) Filed: Nov. 6, 2002

(65) Prior Publication Data

US 2003/0098895 A1 May 29, 2003

(30) Foreign Application Priority Data

Nov. 6, 2001 (JP) ........................................ 2001-340192

(51) Int. Cl.[7] ................................................ B41J 29/38
(52) U.S. Cl. ........................................................ 347/16
(58) Field of Search ............................ 347/16, 14, 19, 347/12, 11, 10, 105, 104, 5

(56) References Cited

U.S. PATENT DOCUMENTS 6,568,784 B2 * 5/2003 Izumi et al. ................... 347/19
6,634,745 B2 * 10/2003 Tanno ........................ 347/107

* cited by examiner

Primary Examiner—Stephen Meier
Assistant Examiner—Charles Stewart, Jr.
(74) Attorney, Agent, or Firm—Sughrue Mion, PLLC

(57) ABSTRACT

The invention enables even further improvement in quality of a recording image. A recording method for recording on a recording paper comprises the steps of: carrying the recording paper for a predetermined amount, based on a first carrying amount for which the recording paper is to be carried; executing recording on the recording paper that has been carried for the predetermined amount; executing an addition process of adding an amount obtained by subtracting the predetermined amount from the first carrying amount to a second carrying amount for which the recording paper is to be carried; and carrying the recording paper based on the second carrying amount to which the addition process has been executed.

20 Claims, 7 Drawing Sheets

METHOD OF CONTROLLING CARRYING OF RECORDING PAPER, RECORDING APPARATUS, AND RECORDING METHOD

BACKGROUND OF THE INVENTION

The present application claims priority upon Japanese Patent Application No. 2001-30192 filed on Nov. 6, 2001, which is herein incorporated by reference.

1. Field of the Invention

The present invention relates to a method of controlling carrying of recording paper, a recording apparatus and a recording method.

Furthermore, the present invention relates to a recording apparatus that is provided with recording execution means for executing recording on a recording paper that has been supplied to a recording execution area, and recording paper carrying means for intermittently carrying the recording paper in the paper-feed direction by rotating a carry driving roller that is driven by a rotation driving power source.

2. Description of the Related Art

As an example of recording paper carrying means for carrying the recording paper by a predetermined carrying amount in the paper-feed direction, means using a carry driving roller that is rotated by a rotation driving power source, such as a stepping motor, is common. The recording paper is pressed and tightly adheres against the outer circumferential surface of the carry driving roller by, for example, driven rollers having biasing means, and the recording paper is carried in the paper-feed direction by the rotation of the carry driving roller. A high-friction resistance coating having fine protrusions and depressions is formed on the outer circumferential surface of the carry driving roller, and due to its friction resistance, the recording paper adheres tightly to the outer circumferential surface of the carry driving roller, and the rotation of the carry driving roller is conveyed without loss.

On the other hand, the rotation driving power source of, for example, the stepping motor rotating the carry driving roller is rotated under control by a recording controller. The recording controller takes-in a signal that is output by means for detecting a rotation amount of the carry driving roller, and when it is detected that the carry driving roller has rotated for an amount corresponding to a predetermined carrying amount, then the controller controls the rotation driving power source so that it stop. This means for detecting the rotation amount of the carry driving roller can be realized by a variety of means, and one example of a conventionally known means is means that detects the rotation amount of the carry driving roller by detecting slits that are formed at equal intervals in a rotor which rotates unitarily with the carry driving roller.

The means for detecting the rotation amount is configured by a rotor that is arranged on a rotation shaft of the carry driving roller and provided with slits at equal intervals serving as targets for a rotation stop position of the rotation driving power source, and slit detection means with which the slits in the rotor can be detected. Controlling of carrying the recording paper for a predetermined carrying amount is performed by controlling rotation of the rotation driving power source rotate with the means for detecting the rotation amount of the carry driving roller, until the means detects a number of slits that corresponds to the predetermined carrying amount of the recording paper.

The unit carrying amount that corresponds to a minimum carrying amount by the recording paper carrying means is the length obtained by dividing the outer circumference of the carry driving roller, that is, the circumference of the outer surface of the carry driving roller, by the total number of slits formed in the rotor. That is to say, the length of the outer circumference of the carry driving roller that corresponds to the slit interval of the slits, which are formed at equal intervals, is the unit carrying amount of the recording paper. Consequently, when carrying the recording paper for a predetermined recording paper carrying amount, first, that predetermined recording paper carrying amount is divided by the unit carrying amount, and to calculate to how many unit carrying amounts this carrying amount corresponds. Subsequently, the rotation driving power source is rotated under control, thus rotating the carry driving roller, until the means has detected this number of slits. Then, when this number of slits has been detected, the rotation driving power source is stopped, thus stopping the carry driving roller.

However, if the recording paper carrying amount supposed to be carried is a carrying amount that cannot be divided out by the unit carrying amount, then the remainder carrying amount that could not be divided out is either rounded down or rounded up, and the recording paper has to be carried with the rounded carrying amount. Thus, a carrying error corresponding to the remainder carrying amount that has been rounded down or rounded up will be accumulated at each carrying step.

Conventionally, shifts in the carrying amount caused by the accumulation of this carrying error due to rounding were not that large to lead to a particularly large decrease in the recording quality, and were not perceived as a big problem.

However, as the image quality of recording apparatuses has increased in recent years, a higher precision is needed for the carrying precision of the carry driving roller, and shifts in the carrying amount due to rounding cannot be ignored anymore. And it can be said that it is already not possible to meet the improvement in image quality of recording apparatuses of recent years with the simple way of carrying of recording paper according to slit units, which are dependent on the precision of the outer diameter of the carry driving roller.

Furthermore, since there are of course variations within the manufacturing tolerances for the outer diameter of the carry driving roller, the carrying error of the recording paper caused by these variations decreases the carrying precision of the carry driving roller. In order to address this, these variations can be reduced by increasing the precision during manufacturing, but this will lead to an increase in manufacturing costs.

By the way, an example of a conventional technology for carrying the recording paper with high precision without necessitating component precision for all components, such as the carry driving roller, has been disclosed in JP H11-49399A.

In this configuration, the carrying amount of the recording paper is controlled by driving, under control, the carry driving roller by a pulse motor, outputting a number of pulses corresponding to the recording paper carrying amount from the pulse motor, and counting the number of pulses output by the pulse motor to control the rotation amount of the carry driving roller. Moreover, a specific rotation reference position is provided on the rotation shaft of the carry driving roller, a periodic fluctuation error of the rotation period of the carry driving roller is calculated from the rotation reference position detected with means for detecting the rotation reference position and the number of pulses output by the pulse motor, and a control for correcting the carrying amount shift caused by this periodic fluctuation error is executed at every rotation reference position. Furthermore, upon correcting the shift of the carrying amount of the recording paper at every rotation reference position, the correction is performed by referring to a correction value table in which correction values for every rotation reference position are stored.

However, this conventional technology disclosed in the above-mentioned publication corrects carrying amount shifts that are caused by periodic fluctuation errors in the carry driving roller, but it does not correct carrying amount shifts caused by the outer diameter precision of the carry driving roller. Consequently, means for detecting the periodic fluctuation error at a specific rotation reference position is necessary, the correction of the carrying amount can be carried out only at a specific rotation reference position, and the shift of the carrying amount cannot be corrected at every carrying step. Consequently, tiny shifts in the carrying amount at every carrying step that are caused due to the precision of the outer diameter the carry driving roller cannot be corrected, so that there seems to be a limit for carrying the recording paper with ever higher precision.

Furthermore, when trying to increase the precision of the correction, the data table necessarily becomes bigger, and an accordingly larger storage medium is needed to store the data table. Consequently, there is the possibility that the problem occurs that low-capacity storage media installed in storage apparatuses of the low price bracket cannot handle such circumstances.

SUMMARY OF THE INVENTION

The present invention has been contrived in view of such a situation, and one object thereof is to realize a further improvement in quality of a recording image.

It is a further object of the present invention to realize a further improvement of the recording image quality with a low-cost recording apparatus while keeping the outer diameter precision of the carry driving roller by a control of the carry of recording paper which gives rise to only small shifts in the recording paper carrying amount and which does not depend on the outer diameter precision of the carry driving roller.

It is a further object of the present invention to realize a recording method having the following steps:

carrying the recording paper for a predetermined amount, based on a first carrying amount for which the recording paper is to be carried;

executing recording on the recording paper that has been carried for the predetermined amount;

executing an addition process of adding an amount obtained by subtracting the predetermined amount from the first carrying amount to a second carrying amount for which the recording paper is to be carried; and carrying the recording paper based on the second carrying amount to which the addition process has been executed.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Figure 1:
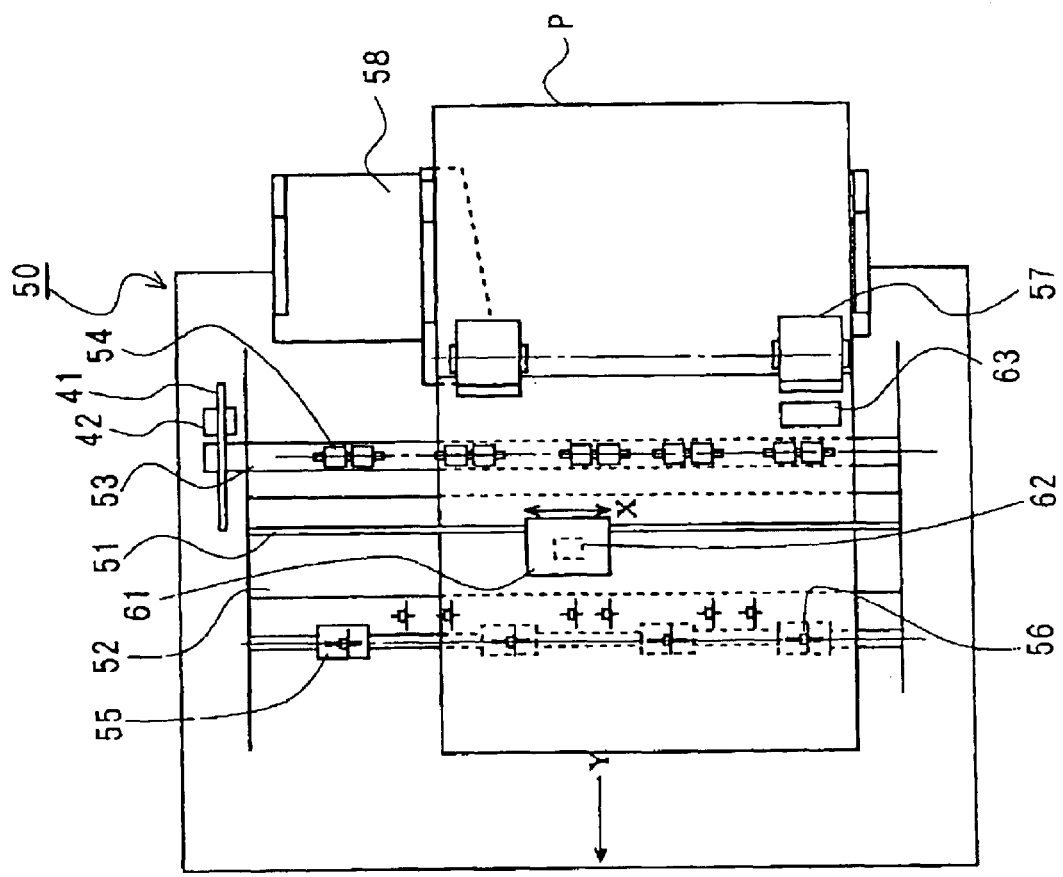
FIG. 1 is a plan view showing the essential portions of an embodiment of an inkjet recording apparatus, which serves as a "recording apparatus" in accordance with the present invention.

At least the following matters will be made clear by the explanation in the present specification and the description of the accompanying drawings.

A method of controlling carrying of recording paper for controlling recording paper carrying means of a recording apparatus, which comprises recording execution means for recording on a recording paper that has been carried into a recording execution area, the recording paper carrying means that has a carry driving roller being rotated by rotation driving force of a rotation driving power source and that is capable of carrying the recording paper in a predetermined direction toward the recording execution area, and carry driving roller rotation position detection means that includes a rotor provided with slits at equal intervals and slit detection means with which the slits can be detected, comprises the steps of:

calculating a unit carrying amount by dividing a circumference of an outer circumferential surface of the carry driving roller by a total number of the slits, the unit carrying amount being a carrying amount of the recording paper that corresponds to the interval of the slits;

calculating a quotient and a remainder carrying amount by dividing a recording paper carrying amount for which the recording paper is to be carried with the recording paper carrying means by the unit carrying amount;

causing the carry driving roller to rotate using the rotation driving power source until the slit detection means detects a number of the slits equal to the quotient; and adding the remainder carrying amount to the recording paper carrying amount for which the recording paper is to be carried for the next time.

First, the circumference of the outer circumferential surface of the carry driving roller is divided by the total number of slits to calculate in beforehand the unit carrying amount, which is a carrying amount of the recording paper that corresponds to the interval of the slits formed in the rotor. It should be noted that within the range of manufacturing errors, the circumference of the outer circumferential surface of the carry driving roller differs for every recording apparatus, so that this unit carrying length is a carrying length that is calculated for every recording apparatus and differs for every recording apparatus.

Subsequently, the quotient and the remainder carrying amount are calculated by dividing the recording paper carrying amount when the recording paper is carried with the recording paper carrying means by the unit carrying amount calculated in beforehand. The calculated quotient indicates to how many of the above-mentioned slits the carrying amount corresponds, and the remainder carrying amount is the left-over carrying amount that is smaller than the unit carrying amount. Subsequently, the recording paper is carried by rotating the carry driving roller until the slit detection means has detected a number of slits that is equal to the quotient. Then, the calculated remainder carrying amount is stored, and added to the recording paper carrying amount for the next carrying.

The carrying of the recording paper is performed with the unit carrying amount serving as the minimum unit, so that carrying for a carrying amount that is smaller than the unit carrying amount is not possible. Thus, since the carrying of recording paper amounting to the remainder carrying amount that is smaller than the unit carrying amount is not possible, the recording paper was conventionally carried after rounding down or rounding up this remainder carrying amount. However, if the recording paper is carried by always rounding-down or rounding-up this remainder carrying amount, then a shift that corresponds to the remainder carrying amount will gradually be accumulated. Consequently, it becomes possible to prevent an error in the carrying amount corresponding to the remainder amount from accumulating, by adding this remainder carrying amount, which used to be rounded down or rounded up conventionally, to the next recording paper carrying amount, and then dividing it by the unit carrying amount.

Thus, since the unit carrying amount is calculated from the circumference of the outer circumferential surface of the carry driving roller measured in beforehand, the precision of the unit carrying amount will not depend on the outer diameter precision of the carry driving roller and there is not risk that it is affected by variations of the carry driving roller occurring during manufacturing. Moreover, since the remainder carrying amount, which is obtained by dividing the recording paper carrying amount by the unit carrying amount, is added to the recording paper carrying amount for the next carrying step, shifts in the carrying amount that are caused by the outer diameter precision of the carry driving roller can be corrected at every carrying step. Therefore, it is not necessary to correct the shifts in the carrying amount caused by periodic fluctuation errors, and also means for detecting a rotation reference position, as in the above-described conventional art, will not be necessary. Furthermore, since the only data that need to be stored in advance is the data for the outer circumference of the carry driving roller, there is no need for a large data storage capacity.

Thus, with this method of controlling carrying of recording paper, since there is no risk that the carrying precision of the recording paper is affected by the outer diameter precision of the carry driving roller, that is, variations in the carry driving roller occurring during manufacturing, the shifts in the recording paper carrying amount are small, and a recording paper carrying control that is not dependent on the outer diameter of the carry driving roller becomes possible.

Moreover, since it is possible to prevent the error amounting to the remainder carrying amount that could not be divided out of the unit carrying amount from accumulating, the shift in the recording paper carrying amount can be reduced. Consequently, it is possible to obtain an operational effect where it is possible to achieve an even further improvement in image quality of recorded images with a low-cost recording apparatus while leaving the outer diameter precision of the carry driving roller as it used to be.

Further, it is preferable that in the step of calculating the unit carrying amount, the unit carrying amount is calculated by dividing the circumference of the outer circumferential surface of the carry driving roller by the total number of the slits after multiplying a correction value $\zeta$ to the circumference of the outer circumferential surface of the carry driving roller.

Since in this case the unit carrying amount is calculated after multiplying the circumference of the outer circumferential surface of the carry driving roller with a correction value $\zeta$, it becomes possible to correct quantitative carrying errors other than the error due to the outer diameter precision of the carry driving roller.

Thus, with this method of controlling carrying of recording paper, since, in addition to the operational effect of the invention as set forth in claim 1 of this application, quantitative carrying errors besides the error due to the outer diameter precision of the carry driving roller can be corrected, it becomes possible to obtain an operational effect where the precision with which the recording paper is carried is improved even further.

Further, it is preferable that the correction value $\zeta$ is a correction value for correcting an error in the circumference due to protrusions and depressions in the outer circumferential surface of the carry driving roller.

As mentioned above, since the outer circumferential surface of the carry driving roller is provided with protrusions and depressions due to a high-friction resistance coating, the surface of the recording paper is in a state where it enters the depressions when it is in close contact with the high-friction resistance coating. On the other hand, as for the outer circumference of the carry driving roller, the protruding portions of the high-friction resistance coating will be measured. Therefore, circumference of the outer circumferential surface actually contacting the surface of the recording paper is slightly shorter than the actually measured circumference of the outer circumferential surface of the carry driving roller, and the carrying amount for which the recording paper is actually carried becomes slightly smaller than the carrying amount of the recording paper that is calculated from the actually measured circumference of the outer circumferential surface of the carry driving roller. Consequently, by setting the correction value $\zeta$ to a value for correcting the error in the outer circumference of the carry driving roller that is caused by the protrusions and depressions in the high-friction resistance coating, it becomes possible to prevent circumstances where the actually carried carrying amount becomes slightly smaller.

Thus, with this method of controlling carrying of recording paper, since, in addition to the operational effects of the invention as set forth in claim 2 of this application, it is possible to prevent the actually carried carrying amount from becoming slightly smaller due to the protrusions and depressions in the high-friction resistance coating on the outer circumferential surface of the carry driving roller, it becomes possible to obtain an operational effect where the error in the carrying amount due to the outer diameter precision of the carry driving roller can be corrected more precisely.

Further, it is preferable that the correction value $\zeta$ is a correction value being set to a value for correcting an error in the carrying amount that is caused by slippage occurring between the surface of the carry driving roller and the surface of the recording paper, and set depending on the type of the recording paper.

As explained above, when the recording paper is carried with the carry driving roller, a small amount of slippage occurs between the outer circumferential surface of the carry driving roller and the surface of the recording paper, and this results in an error in the carrying amount. Moreover, since the frictional resistance of the surface of the recording paper differs depending on the type of recording paper, also the small amount of slippage occurring between the surface of the carry driving roller and the surface of the recording paper will differ depending on the type of recording paper. Consequently, by setting the correction value $\zeta$ to a value for correcting the error in the carrying amount that is caused by the small amount of slippage between the surface of the carry driving roller and the surface of the recording paper, it becomes possible to reduce the shifts in the carrying amount caused by the small amount of slippage between the surface of the carry driving roller and the surface of the recording paper.

Thus, with this method of controlling carrying of recording paper, since, in addition to the operational effects of the invention as set forth in claim 2 of this application, it is possible to prevent shifts in the carrying amount caused by the small amount of slippage between the surface of the carry driving roller and the surface of the recording paper, it becomes possible to obtain an operational effect in that, by setting a correction value $\zeta$ for each type of recording paper the error in the carrying amount caused by the small amount of slippage between the surface of the carry driving roller and the surface of the recording paper can be corrected for every type of recording paper.

Further, it is further preferable that the method comprises a step in which the unit carrying amount is set arbitrarily by a user.

With this method of controlling carrying of recording paper, it becomes possible to obtain an operational effect in that the user can adjust the unit carrying amount while confirming the recording quality.

Further, a recording apparatus comprises:

recording execution means for recording on a recording paper that has been carried into a recording execution area;

recording paper carrying means having a carry driving roller for carrying the recording paper in a predetermined direction toward the recording execution area by rotation driving force of a rotation driving power source;

carry driving roller rotation position detection means that includes a rotor provided with slits at equal intervals and slit detection means with which the slits can be detected;

unit carrying amount calculation means for calculating a unit carrying amount by dividing a circumference of an outer circumferential surface of the carry driving roller by a total number of the slits, the unit carrying amount being a carrying amount of the recording paper that corresponds to the interval of the slits;

recording paper carrying amount calculation means for calculating a quotient and a remainder carrying amount by dividing a recording paper carrying amount for which the recording paper is to be carried with the recording paper carrying means by the unit carrying amount;

rotation driving power source control means for causing the carry driving roller to rotate using the rotation driving power source until the slit detection means detects a number of the slits equal to the quotient; and remainder carrying amount adding means for adding the remainder carrying amount to the recording paper carrying amount for which the recording paper is to be carried for the next time.

In this recording apparatus, it is preferable that the unit carrying amount calculation means calculates the unit carrying amount by dividing the circumference of the outer circumferential surface of the carry driving roller by the total number of the slits after multiplying a correction value $\zeta$ to the circumference of the outer circumferential surface of the carry driving roller.

In this recording apparatus, it is further preferable that the correction value $\zeta$ is a correction value for correcting an error in the circumference due to protrusions and depressions in the outer circumferential surface of the carry driving roller.

In this recording apparatus, it is further preferable that the correction value $\zeta$ is a correction value being set to a value for correcting an error in the carrying amount that is caused by slippage occurring between the surface of the carry driving roller and the surface of the recording paper, and set depending on the type of the recording paper.

In this recording apparatus, it is further preferable that the record carrying control device has unit carrying amount setting means with which a user can arbitrarily set the unit carrying amount.

Further, a computer-readable storage medium records threreon a recording paper carrying control program for causing a computer to execute a recording paper carrying control for a recording apparatus, the recording apparatus comprising recording execution means for recording on a recording paper that has been carried into a recording execution area, recording paper carrying means that has a carry driving roller for carrying the recording paper in a predetermined direction toward the recording execution area by rotation driving force of a rotation driving power source, and carry driving roller rotation position detection means that includes a rotor provided with slits at equal intervals and slit detection means with which the slits can be detected, the program causing a computer to execute the steps of:

calculating a unit carrying amount by dividing a circumference of an outer circumferential surface of the carry driving roller by a total number of the slits, the unit carrying amount being a carrying amount of the recording paper that corresponds to the interval of the slits;

calculating a quotient and a remainder carrying amount by dividing a recording paper carrying amount for which the recording paper is to be carried with the recording paper carrying means by the unit carrying amount;

causing the carry driving roller to rotate using the rotation driving power source until the slit detection means detects a number of the slits equal to the quotient; and adding the remainder carrying amount to the recording paper carrying amount for which the recording paper is to be carried for the next time.

In this recording medium, it is further preferable that, in the step of calculating the unit carrying amount, the unit carrying amount is calculated by dividing the circumference of the outer circumferential surface of the carry driving roller by the total number of the slits after multiplying a correction value $\zeta$ to the circumference of the outer circumferential surface of the carry driving roller.

In this recording medium, it is further preferable that the correction value $\zeta$ is a correction value for correcting an error in the circumference due to protrusions and depressions in the outer circumferential surface of the carry driving roller.

In this recording medium, it is further preferable that the correction value $\zeta$ is a correction value being set to a value for correcting an error in the carrying amount that is caused by slippage occurring between the surface of the carry driving roller and the surface of the recording paper, and set depending on the type of the recording paper.

In this recording medium, it is further preferable that there is a unit carrying amount setting step in which the unit carrying amount is set arbitrarily by a user.

Further, a recording method for recording on a recording paper, comprises the steps of:

carrying the recording paper for a predetermined amount, based on a first carrying amount for which the recording paper is to be carried;

executing recording on the recording paper that has been carried for the predetermined amount;

executing an addition process of adding an amount obtained by subtracting the predetermined amount from the first carrying amount to a second carrying amount for which the recording paper is to be carried; and carrying the recording paper based on the second carrying amount to which the addition process has been executed.

Further, a recording apparatus for recording on a recording paper, comprises:

recording paper carrying means for carrying the recording paper; and recording execution means for executing recording on the recording paper, wherein:

the recording paper carrying means carries the recording paper for a predetermined amount, based on a first carrying amount for which the recording paper is to be carried;

the recording execution means executes recording on the recording paper that has been carried for the predetermined amount; and the recording paper carrying means carries the recording paper based on an amount obtained by adding an amount obtained by subtracting the predetermined amount from the first carrying amount to a second carrying amount for which the recording paper is to be carried.

Further, a recording apparatus for recording on recording paper, comprises:

a carry driving roller for carrying the recording paper; and a recording head for executing recording on the recording paper, wherein:

the carry driving roller carries the recording paper for a predetermined amount, based on a first carrying amount for which the recording paper is to be carried;

the recording head executes recording on the recording paper that has been carried for the predetermined amount; and the carry driving roller carries the recording paper based on an amount obtained by adding an amount obtained by subtracting the predetermined amount from the first carrying amount to a second carrying amount for which the recording paper is to be carried.

Further, a method of controlling carrying of recording paper for controlling a carry driving roller of a recording apparatus, which comprises a recording head for recording on a recording paper that has been carried into a recording execution area, the carry driving roller that is rotated by rotation driving force of a rotation driving power source and that is capable of carrying the recording paper in a predetermined direction toward the recording execution area, a rotor that is provided with slits at equal intervals, and a slit detector with which the slits can be detected, comprises the steps of:

calculating a unit carrying amount by dividing a circumference of an outer circumferential surface of the carry driving roller by a total number of the slits, the unit carrying amount being a carrying amount of the recording paper that corresponds to the interval of the slits;

calculating a quotient and a remainder carrying amount by dividing a recording paper carrying amount for which the recording paper is to be carried with the carry driving roller by the unit carrying amount;

causing the carry driving roller to rotate using the rotation driving power source until the slit detector detects a number of the slits equal to the quotient; and adding the remainder carrying amount to the recording paper carrying amount for which the recording paper is to be carried for the next time.

Further, a recording apparatus comprises:

a recording head for recording on a recording paper that has been carried into a recording execution area;

a carry driving for carrying the recording paper in a predetermined direction toward the recording execution area by rotation driving force of a rotation driving power source;

a rotor provided with slits at equal intervals;

a slit detector with which the slits can be detected;

a unit carrying amount calculator for calculating a unit carrying amount by dividing a circumference of an outer circumferential surface of the carry driving roller by a total number of the slits, the unit carrying amount being a carrying amount of the recording paper that corresponds to the interval of the slits;

a recording paper carrying amount calculator for calculating a quotient and a remainder carrying amount by dividing a recording paper carrying amount for which the recording paper is to be carried with the recording paper carrying means by the unit carrying amount;

a rotation driving power source controller for causing the carry driving roller to rotate using the rotation driving power source until the slit detector detects a number of the slits equal to the quotient; and a remainder carrying amount adder for adding the remainder carrying amount to the recording paper carrying amount for which the recording paper is to be carried for the next time.

Below, explanation will be made of an embodiment of the present invention with reference to the drawings.

First, the general configuration of an inkjet recording apparatus, which serves as a "recording apparatus" according to the present invention, is explained.

Figure 2:
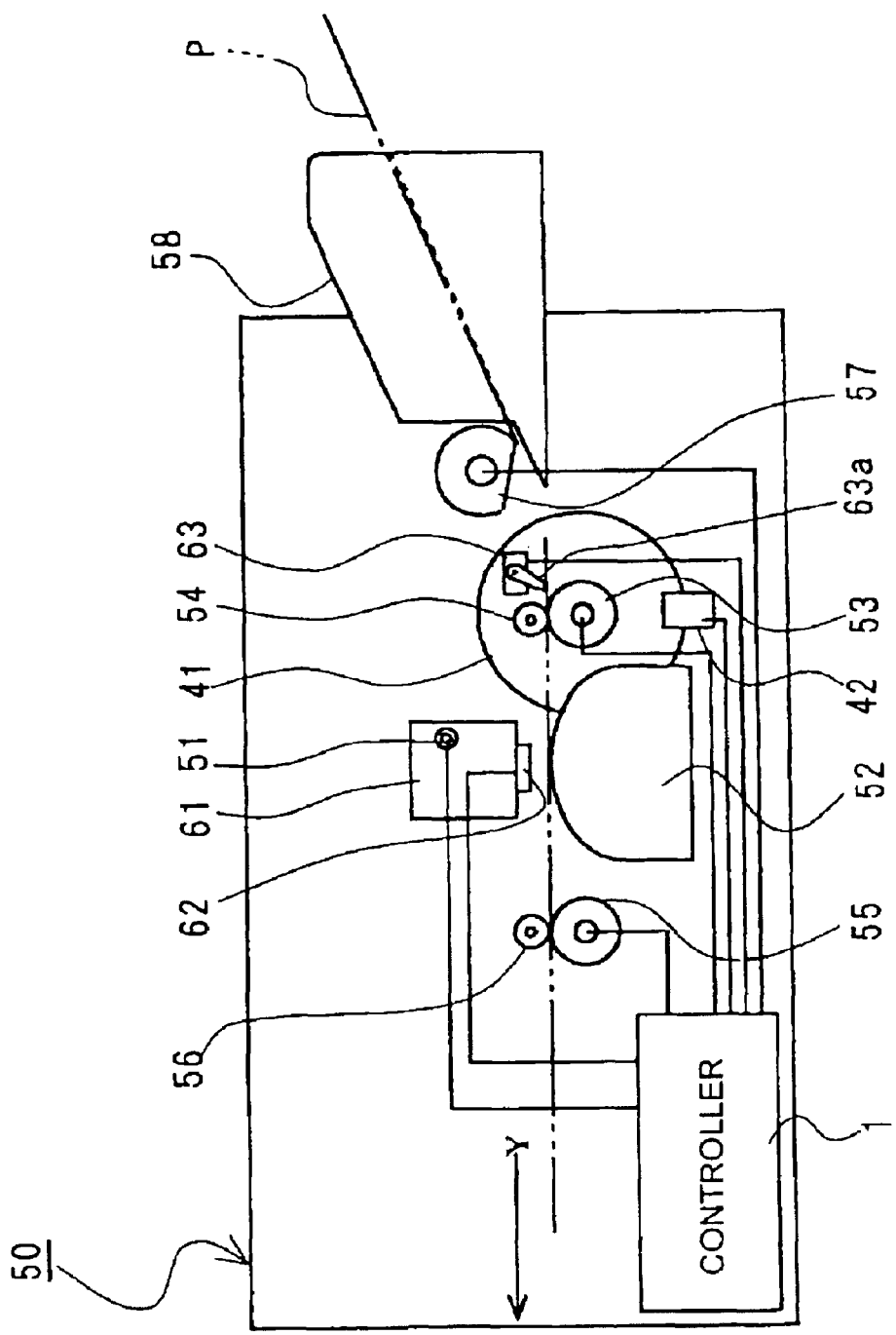
FIG. 2 is a side view showing the essential portions of an embodiment of the inkjet recording apparatus, which serves as a "recording apparatus" in accordance with the present invention.

FIG. 1 is a plan view showing the essential portions of an embodiment of an inkjet recording apparatus, which is a "recording apparatus" according to the present invention, and FIG. 2 is a side view of the essential portions.

An inkjet recording apparatus 50 is provided with a recording head 62 for ejecting ink onto a recording paper P, The recording head is mounted to a carriage 61 as a "recording execution means" for executing recording by ejecting ink onto the recording surface of the recording paper P while moving back and forth in the main scanning direction X above the recording surface. The carriage 61 is supported by a carriage guide shaft 51, and moves in the main scanning direction X. Further, a platen 52 defining the distance between the head surface of the recording head 62 and the recording paper P is provided in opposition to the recording head 62. While moving the carriage 61 in the main scanning direction X and carrying the recording paper P between the carriage 61 and the platen 52 in the paper feed direction Y, a recording is performed on the recording paper P by ejecting ink from the head surface of the recording head 62 onto the recording paper P.

Furthermore, the inkjet recording device 50 is equipped with an automatic paper supply device having a configuration with which a single-sheet recording paper P, such as plain paper or photo paper, can be supplied to a paper supply path. The automatic paper supply device includes, for example, paper supply rollers 57 having a substantially D-shaped lateral cross section and separation pads not shown in the figures. The automatic paper supply device has a configuration that, with the rotation driving force of the paper supply rollers 57 and the friction resistance of the separation pads, allows precise automatic paper supply of only the uppermost recording paper P without supplying a plurality of recording papers P at once, when trying to supplying the uppermost recording paper P of the recording paper P stacked in a paper supply tray 58.

Moreover, the inkjet recording apparatus 50 is equipped with a carry driving roller 53 and carry driven rollers 54, as "recording paper carrying means" for intermittently carrying the supplied recording paper P in the paper-feed direction Y. The carry driving roller 53 is rotated, under control, by, for example, a stepping motor serving as a "rotation driving power source," and the recording paper P is carried in the paper-feed direction Y by the rotation of the carry driving roller 53. A plurality of carry driven rollers 54 are provided, which are individually biased toward the carry driving roller 53, and are rotated as they contact the recording paper P and follow the carrying of the recording paper P, while the recording paper P is carried by the rotation of the carry driving roller 53.

A paper detector 63 is arranged on the upstream side with respect to the paper-feed direction Y of the carry driving roller 53. The paper detector 63 has a lever portion 63a provided with the property to restore itself to an upright position and pivotally supported such that it protrudes into the carrying path of the recording paper P and such that it can turn only in the recording paper carrying direction. The paper detector 63 has a configuration in which the lever portion 63a turns when the tip of the lever portion 63a is pressed against the recording paper P, thus detecting the recording paper P.

The inkjet recording apparatus 50 is further provided with a paper discharge driving roller 55 and paper discharge driven rollers 56, as a means for discharging the recording paper P in the paper-feed direction Y.

The paper discharge driving roller 55 is rotated, under control, by, for example, a stepping motor serving as a rotation driving power source, and the recording paper P is discharged in the paper-feed direction Y by the rotation of the paper discharge driving roller 55. The paper discharge driven rollers 56 are teethed rollers that have a plurality of teeth on their circumferences, and the tips of these teeth are sharpened acutely such that they come in point contact with the recording surface of the recording paper P. The paper discharge driven rollers 56 are biased individually towards the paper discharge driving roller 55 with a spring force that is weaker than the spring force of the above-mentioned carry driven rollers 54, and are rotated as they contact the recording paper P and follow the discharge of the recording paper P, while the recording paper P is discharged due to the rotation of the discharge driving rollers 55. Then, the recording paper P is discharged onto a not-shown paper discharge tray which is arranged downstream in the paper-feed direction Y from the paper discharge driving roller 55 and the paper discharge driven rollers 56.

The inkjet recording apparatus 50 is further equipped with a rotor 41 and a slit detector 42, as a "carry driving roller rotation position detection means." The rotor 41 is a disk in which slits, which are targets for the rotation stop position of, for example, the stepping motor serving as the rotation driving power source, are formed at equal intervals, and is attached to a rotation shaft of the carry driving roller 53. The slit detector 42 is "slit detection means" with which the slits formed in the rotor 41 can be detected.

The inkjet recording device 50 is also provided with a recording controller 1 configured by a CPU, a microcomputer or the like, into which the detection states of the afore-mentioned paper detector 63 and the slit detector 42 are entered and which controls the recording execution means, the automatic paper supply means, the recording paper carrying means, and the recording paper discharge means. The recording control of the inkjet recording apparatus 50 is carried out by this recording controller 1.

Figure 3:
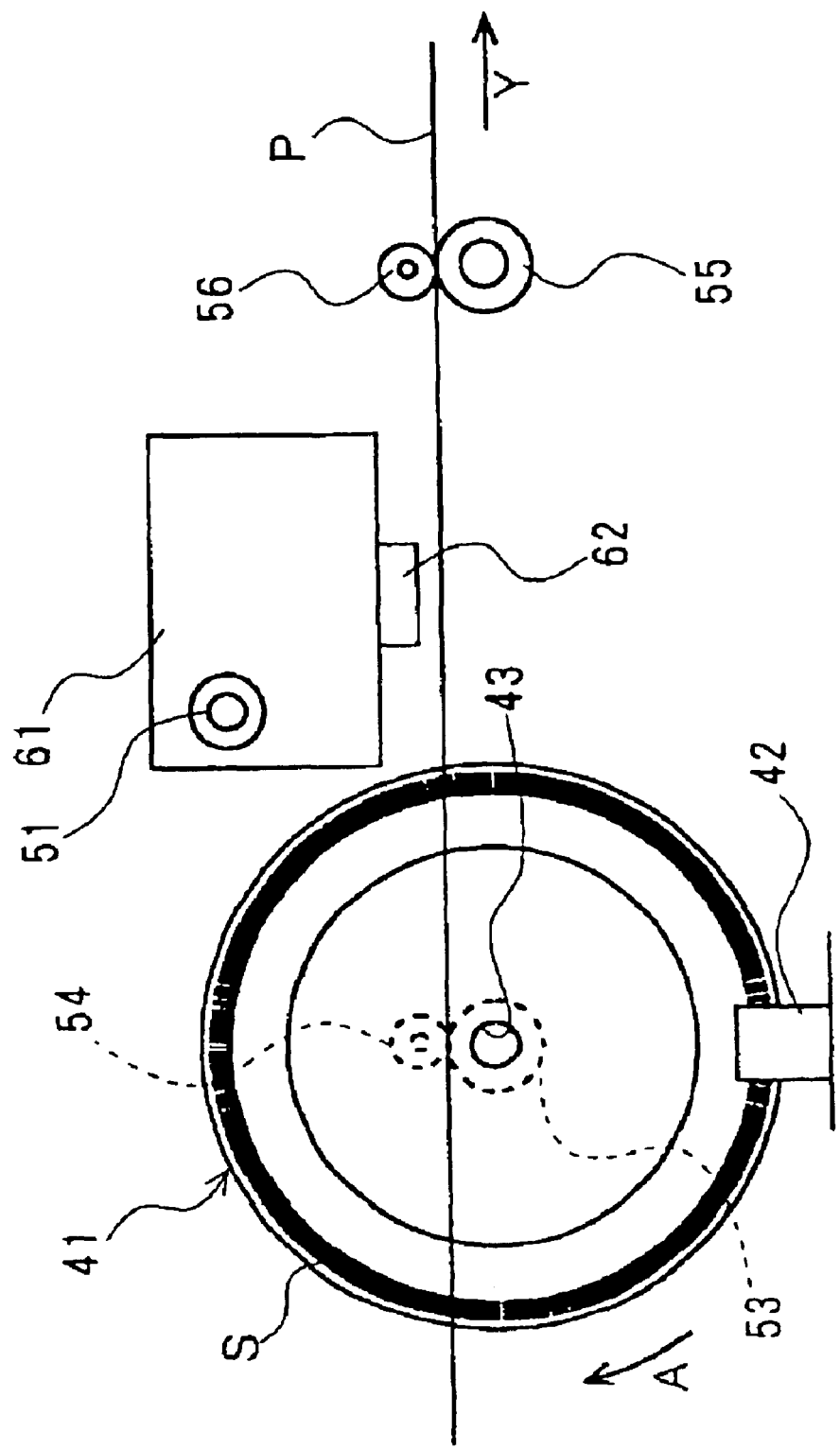
FIG. 3 is a side view showing the essential portions of the inkjet recording apparatus, which serves as a "recording apparatus" in accordance with the present invention, and shows the vicinity of the rotor.
Figure 4:
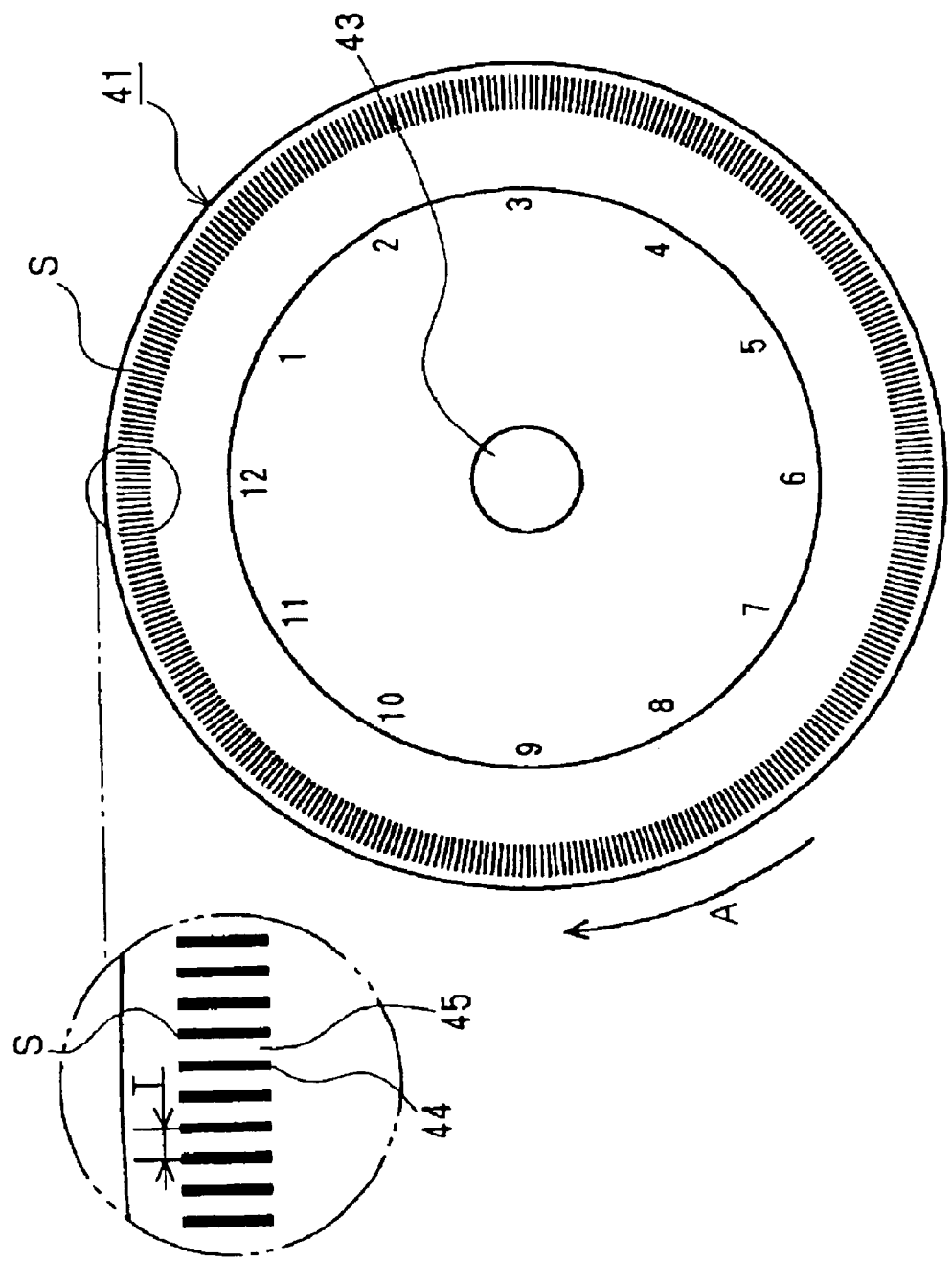
FIG. 4 shows the rotor and an enlarged view of some of the slits in the rotor of the inkjet recording apparatus, which serves as a "recording apparatus" in accordance with the present invention.

FIG. 3 is a side view of the essential portions of an inkjet recording device 50, which is a "recording device" in accordance with the present invention, and shows the vicinity of the rotor 41. FIG. 4 shows the rotor 41 and an enlarged view of some of the slits S of the rotor 41.

As for the rotor 41, the rotation shaft of the carry driving roller 53 is fitted into an attachment holes 43 formed in the center of the rotor 41, and it is arranged such that it rotates together with the carry driving roller 53. The rotor 41 is made of a transparent material through which light can pass sufficiently well, and a multitude of slits S are formed at equal intervals near its outer circumference. These slits S form, in the rotor 41, light-blocking portions through which light cannot pass at equal intervals. Consequently, near the outer circumference of the rotor 41, light-blocking portions 44 provided by the slits S and light-passing portions 45 between the slits S are formed alternately at intervals of the slits S.

The slit detector 42 is an optical sensor with which the light-passing portions 45 and the light-blocking portions 44 (slits S) can be detected. The detector is configured by arranging a light-emitting element and a light-receiving element flanking the rotor 41 such that light emitted from the light-emitting element is detected with the light-receiving element. When a light-blocking portion 44 is positioned between the light-emitting element and the light-receiving element, then the light emitted from the light-emitting element is blocked by that light-blocking portion 44 and is not detected by the light-receiving element; thus the output signal of the slit detector 42 will be OFF. When a light-passing portion 45 is positioned between the light-emitting element and the light-receiving element, then the light emitted from the light-emitting element passes through the light-passing portion 45 and is detected by the light-receiving element; thus the output signal of the slit detector 42 will be ON.

Consequently, the carry driving roller 53 is rotated by the rotation driving force of a rotation driving power source, such as a stepper motor, and when the rotor 41 attached to the rotation shaft of the carry driving roller 53 is rotated in the direction indicated by the arrow marked "A," then the operation of turning the output signal of the slit detector 42 from ON to OFF and again to ON will be repeated whenever a slit S is detected. Then, to the recording controller 1 is input the output signal from the slit detector 42.

Next, explanation will be made of the recording paper carrying control procedure that is executed when the recording paper P is carried by a predetermined recording paper carrying amount.

It is to be noted that a program for carrying out the following recording paper carrying control is recorded on a computer-readable storage medium (for example a memory with which the recording controller 1 is provided). The recording paper carrying control is executed by, for example, reading this program into the CPU of the recording controller 1.

Figure 5:
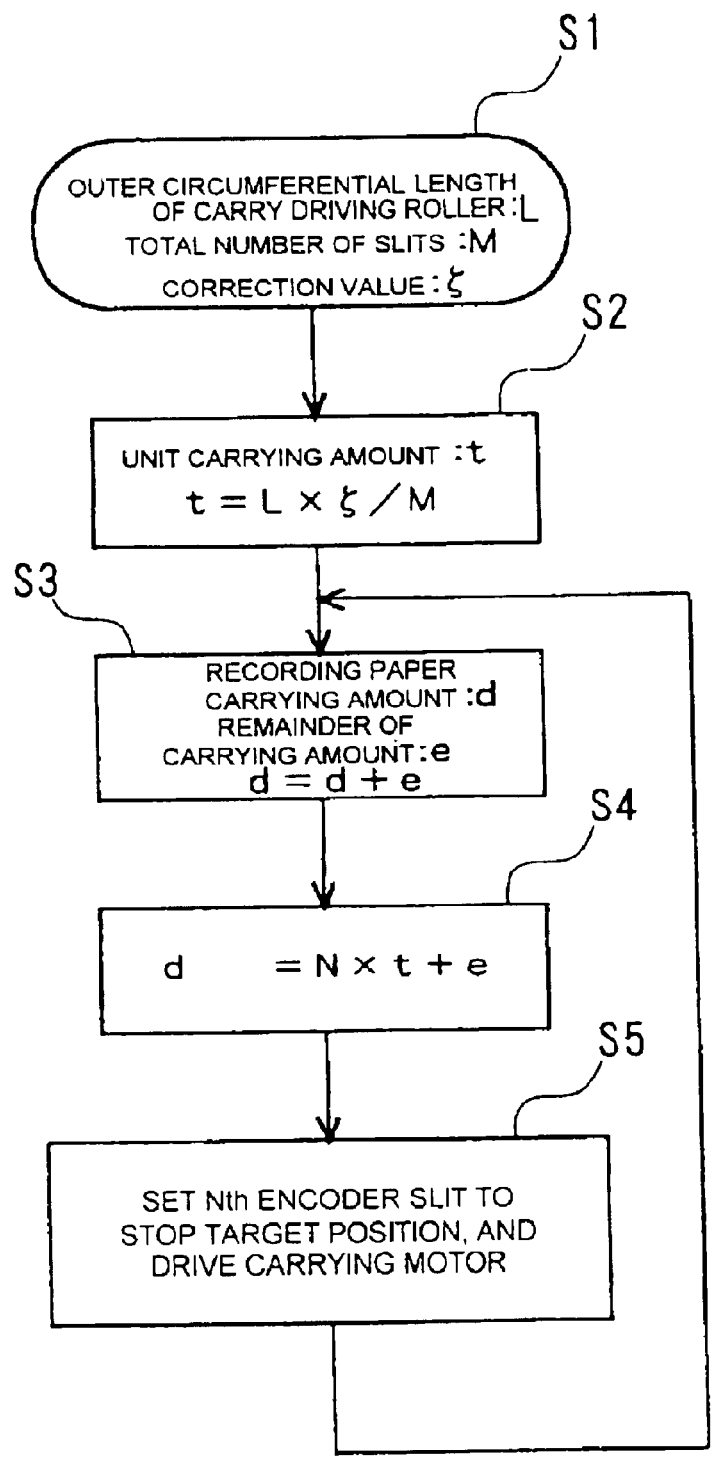
FIG. 5 is a flowchart showing a procedure for controlling recording paper carrying in accordance with the present invention.

FIG. 5 is a flowchart showing a recording paper carrying control procedure in accordance with the present invention.

First, the unit carrying amount of the recording paper P corresponding to the interval T of the slits S is calculated. Taking the outer circumference L as the outer circumference of the carry driving roller 53, taking the total slit number M as the total number of slits S formed in the rotor 41, and taking the correction value ζ as the correction value (step S1), the unit carrying amount t, which is to be the minimum carrying step when carrying the recording paper P, takes on the value obtained by multiplying the outer circumference L with the correction amount ζ and dividing the value obtained by multiplication by the total slit number M (Step S2).

$$t = L \times \zeta / M \qquad (1)$$

That is to say, by dividing the total circumference L by the total slit number M, it is possible to calculate the length on the outer circumferential surface of the carry driving roller 53, the length corresponding to the slit interval T. The recording paper P is carried by the rotation of the carry driving roller 53 while adhering to the outer circumferential surface of the carry driving roller 53, and thus, the length on the outer circumferential surface of the carry driving roller 53 that corresponds to the slit interval T becomes the unit carrying amount t of the recording paper P that corresponds to the slit interval T.

The following is an explanation of the correction value ζ. As explained above, the outer circumferential surface of the carry driving roller 53 is provided with protrusions and depressions due to a high-friction resistance coating, and thus, the outer circumference that actually comes in contact with the surface of the recording paper P is slightly shorter than the actually measured outer circumference L of the carry driving roller 53. Therefore, the unit carrying amount when the recording paper P is actually carried becomes slightly smaller than the unit carrying amount t of the recording paper P that is calculated from the actually measured outer circumference L of the carry driving roller 53.

In order to address this issue, by setting the correction value ζ to a value that corrects the error of the outer circumference L of the carry driving roller 53 that is caused by the protrusions and depressions in the high-friction resistance coating, it becomes possible to prevent circumstances where the unit carrying amount when the paper is actually carried becomes slightly shorter. More specifically, it is set to an experimentally determined value and is set to such a value that enlarges the outer diameter of the carry driving roller 53. Consequently, since it is possible to prevent circumstances where the actually measured carrying amount becomes slightly smaller due to the protrusions and depressions in the high-friction resistance coating on the outer circumferential surface of the carry driving roller 53, the error in the carrying amount due to the outer diameter precision of the carry driving roller 53 can be corrected more precisely.

Next, taking the recording paper carrying amount d as the carrying amount of the recording paper P, a remainder carrying amount e is added to the recording paper carrying amount d, and the sum is taken as the recording paper carrying amount d (Step S3).

$$d = d + e \qquad (2)$$

The remainder carrying amount e is the carrying error that has occurred in the previous carrying step of the recording paper P, and by adding this carrying error to the recording paper carrying amount d, it is possible to prevent the carrying error from accumulating. Consequently, in the first carrying step of intermittently carrying the recording paper P in the paper-feed direction Y, the remainder carrying amount e is zero. The remainder carrying amount e is explained in more detail below.

Subsequently, the recording paper carrying amount d is divided by the unit carrying amount t, and the quotient N as well as the remainder carrying amount e, which is the carrying amount that could not be divided out, are calculated (Step S4).

$$d = N \times t + e \qquad (3)$$

That is to say, the amount that the recording paper is actually carried is the carrying amount obtained by taking N times the unit carrying amount t, which is the minimum carrying amount that is possible, and the remainder carrying amount e being the remainder is a carrying amount that is less than the unit carrying amount t, and thus it is a carrying amount over which carrying is not possible.

Subsequently, the rotation driving power source, such as the stepping motor driving the carry driving roller 53, is driven from the detection position of the slits S at which it is currently stopped, taking the N-th slit S as the target of the rotation stop position of the carry driving roller 53 (Step S5). Thus, the recording paper P is carried by the carrying amount obtained by multiplying the unit carrying amount t with the quotient N, that is to say, the carrying amount obtained by subtracting the remainder carrying amount e from the recording paper carrying amount d.

Then, the remainder carrying amount e for which the recording paper could not be carried is added to the recording paper carrying amount d at the next carrying step, and this sum is taken as the recording paper carrying amount d (Step S3). Thus, the remainder carrying amount e is not discarded but added during the next carrying step, and the recording paper P will be carried accordingly; therefore, an accumulation of the carrying error due to discarding of the remainder carrying amount e can be prevented.

Figure 6:
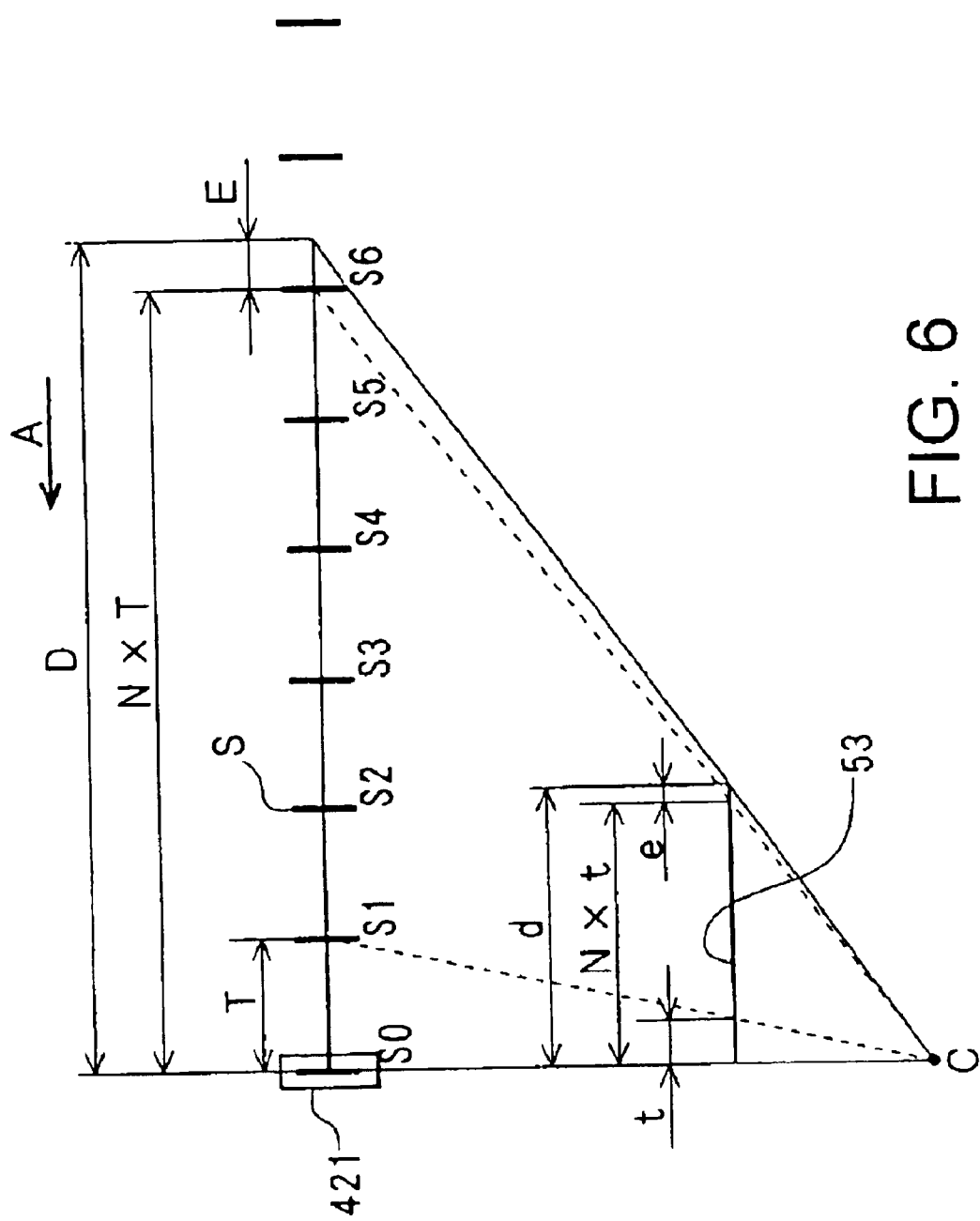
FIG. 6 schematically illustrates the relation between the outer circumferential surface of the carry driving roller and the slits formed in the rotor.

FIG. 6 schematically illustrates the relation between the outer circumferential surface of the carry driving roller 53 and the slits S formed in the rotor 41.

The point marked by "C" indicates the rotation center of the carry driving roller 53. The slit detection point 421 is the detection position of the slit detector 42. Here, assuming that the carry driving roller 53 is rotated only for the distance of the recording paper carrying amount d that the recording paper P is supposed to be carried, the recording paper carrying amount d on the outer circumferential surface of the carry driving roller 53 corresponds to the rotation amount marked "D" in the portion of the rotor 41 where the slits S are formed. Furthermore, as explained above, the unit carrying amount t is the carrying amount corresponding to the interval T of the slits S. Consequently, the carrying amount obtained by dividing the remainder carrying amount e from the recording paper carrying amount d, that is, the carrying amount obtained by multiplying the quotient N with the unit carrying amount t, corresponds to the rotation amount obtained by multiplying the quotient N with the interval T of the slits S.

In this figure, since the quotient N is 6, the slit S6, that is, the sixth slit after slit S0 that is presently being detected at the slit detection position 421 of the slit detector 42, becomes the rotation stop target position. Then, the rotation driving power source, such as the stepping motor driving the carry driving roller 53, is driven, and when the rotor 41 has rotated up to the rotation position where the slit S6 is detected at the slit detection position 421, the rotation driving power source is controlled to stop. The rotation amount marked by "E," which corresponds to the remainder carrying amount e is a rotation amount that is smaller than the interval T of the slits S; thus, its rotation control is not possible. Consequently, the remainder carrying amount e is added to the recording paper carrying amount d of the next carrying step, and the above-described recording paper carrying control procedure is repeated with the recording paper carrying amount d to which the remainder carrying amount e has been added.

Thus, the recording method for recording on the recording paper P includes the following steps:

the carry driving roller 53 carries the recording paper for a predetermined amount, based on a first carrying amount for which the recording paper is supposed to be carried;

the recording head 62 executes recording on the recording paper that has been carried by the predetermined amount;

the recording controller 1 executes an addition process of adding an amount obtained by subtracting the predetermined amount from the first carrying amount to a second carrying amount for which the recording paper is supposed to be carried; and the carry driving roller 53 carries the recording paper based on the second carrying amount obtained by this addition process.

Furthermore, in this working example, the recording controller 1 is:

unit carrying amount calculation means for calculating a unit carrying amount by dividing a circumference of an outer circumferential surface of the carry driving roller by a total number of the slits, the unit carrying amount being a carrying amount of the recording paper that corresponds to the interval of the slits;

recording paper carrying amount calculation means for calculating a quotient and a remainder carrying amount by dividing a recording paper carrying amount for which the recording paper is to be carried with the recording paper carrying means by the unit carrying amount;

rotation driving power source control means for causing the carry driving roller to rotate using the rotation driving power source until the slit detection means detects a number of the slits equal to the quotient; and remainder carrying amount adding means for adding the remainder carrying amount to the recording paper carrying amount for which the recording paper is to be carried for the next time.

Moreover, in this working example, the recording controller 1 is also:

a unit carrying amount calculator for calculating a unit carrying amount by dividing a circumference of an outer circumferential surface of the carry driving roller by a total number of the slits, the unit carrying amount being a carrying amount of the recording paper that corresponds to the interval of the slits;

a recording paper carrying amount calculator for calculating a quotient and a remainder carrying amount by dividing a recording paper carrying amount for which the recording paper is to be carried with the recording paper carrying means by the unit carrying amount;

a rotation driving power source controller for causing the carry driving roller to rotate using the rotation driving power source until the slit detector detects a number of the slits equal to the quotient; and a remainder carrying amount adder for adding the remainder carrying amount to the recording paper carrying amount for which the recording paper is to be carried for the next time.

Since the unit carrying amount t is calculated from the circumference of the outer circumferential surface measured separately for each carry driving roller 53, the precision of the unit carrying amount t does not depend on the outer diameter precision of the carry driving roller 53, and there is no risk that it is affected by variations during the manufacturing of the carry driving rollers 53. Furthermore, since the remainder carrying amount e, which is obtained by dividing the recording paper carrying amount d by the unit carrying amount t, is added to the recording paper carrying amount d of the next carrying step, shifts in the carrying amount caused by the outer diameter precision of the carry driving roller 53 can be corrected at each carrying step. Therefore, there is no need to compensate shifts in the carrying amount caused by periodic fluctuation errors, and there is no need for a means for detecting a rotation reference position as in the above-described conventional art. Furthermore, since the only data that need to be stored in advance is the data for the outer circumference of the carry driving roller 53, there is no need for a large data storage capacity.

An example of another embodiment is one in which, in addition to the embodiment described above, the carrying amount is rounded up if the value of the remainder carrying amount e is at least ½ of the unit carrying amount t, and a negative remainder carrying amount −e is added to the recording paper carrying amount d for the next carrying step.

Figure 7:
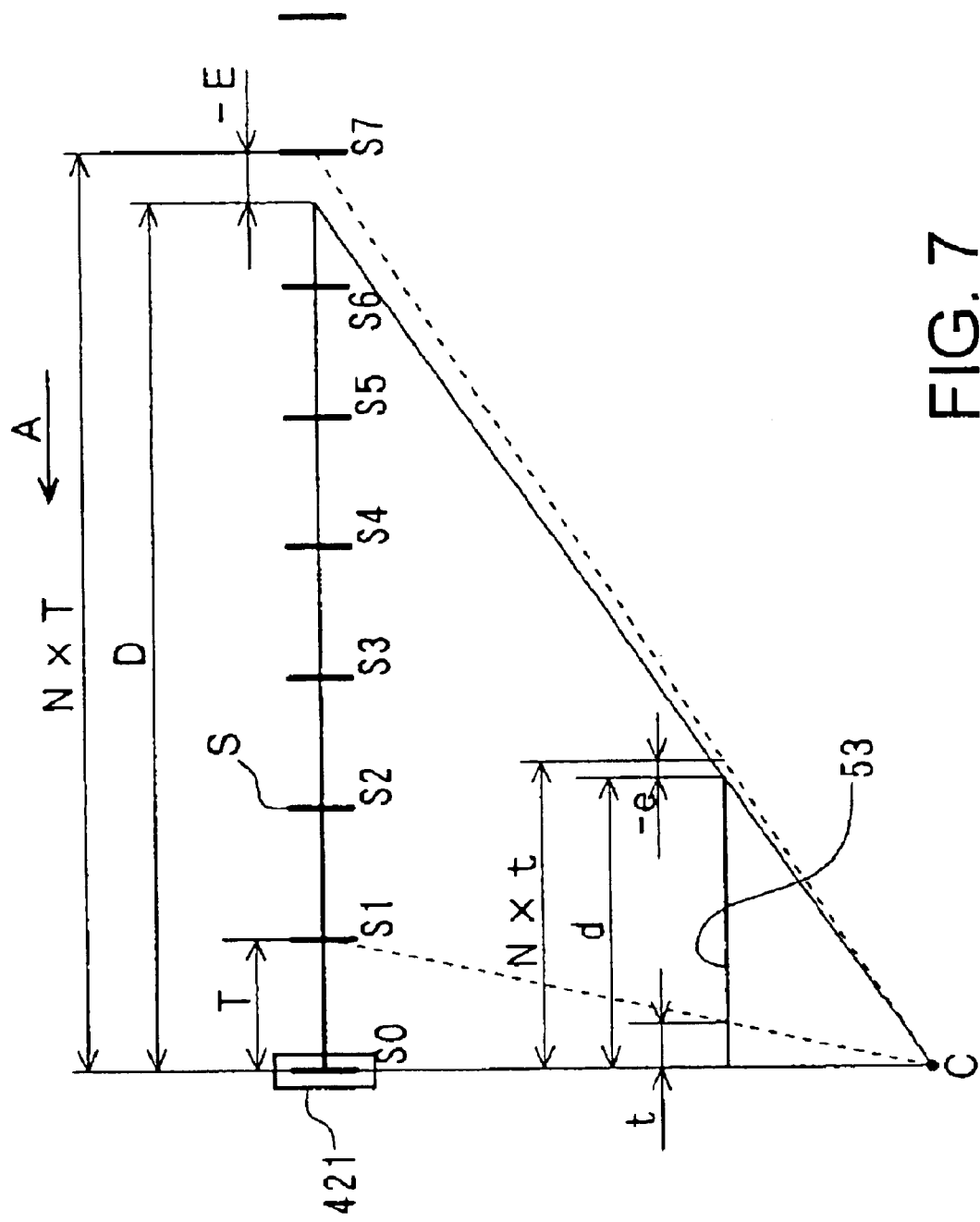
FIG. 7 schematically illustrates the relation between the outer circumferential surface of the carry driving roller and the slits formed in the rotor, and illustrates a situation in which the remainder carrying amount becomes a negative remainder carrying amount.

FIG. 7 schematically illustrates the relation between the outer circumferential surface of the carry driving roller 53 and the slits S formed in the rotor 41. In FIG. 7, the remainder carrying amount e is a negative remainder carrying amount −e.

If the value of the remainder carrying amount e is at least ½ of the unit carrying amount t, then the carrying amount is rounded up, 1 is added to the quotient, and a negative remainder carrying amount −e is assumed. Then, the carrying amount obtained by adding the remainder carrying amount −e to the recording paper carrying amount d, that is, the carrying amount obtained by adding 1 to the quotient N and multiplying it with the unit carrying amount t, corresponds to the rotation amount obtained by adding 1 to the quotient N and multiplying it with the interval T of the slits S.

In this figure, the quotient N is 7, as obtained by adding 1 to 6, so that slit S7, that is, the seventh S slit after slit S0 which is presently detected at the slit detection position 421 of the slit detector 42, becomes the rotation stop target position. Then, the rotation driving power source, such as the stepping motor driving the carry driving roller 53, is driven, and when the rotor 41 has rotated up to the rotation position where the slit S7 is detected at the slit detection position 421, the rotation driving power source is controlled to stop. The rotation amount marked by "−E," which corresponds to the remainder carrying amount −e, is added to the recording paper carrying amount d for the next carrying step, and the above-described recording paper carrying control procedure is repeated with the recording paper carrying amount d to which the remainder carrying amount −e has been added.

Thus, if the value of the remainder carrying amount e is at least ½ of the unit carrying amount t, then the carrying amount is rounded up, 1 is added to the quotient, and a negative remainder carrying amount −e is assumed, and thus, the absolute value of the remainder carrying amount can be reduced; accordingly, the carrying precision at every carrying step can be improved.

Furthermore, an example of another embodiment is one in which, in addition to the embodiment described above, the value of the correction value ζ is taken to be a correction value ζ that corrects the carrying error caused by slippage between the surface of the recording paper P and the outer circumferential surface of the carry driving roller 53, the correction value ζ being dependent on the type of recording paper P.

As described above, when the recording paper P is carried by the carry driving roller 53, there is a small amount of slippage between the outer circumferential surface of the carry driving roller 53 and the surface of the recording paper P, and this leads to an error in the carrying amount. The friction resistance of the surface of the recording paper P is different depending on the type of recording paper P, and thus, also the small amount of slippage between the surface of the carry driving roller 53 and the surface of the recording paper P differs depending on the type of recording paper P. Consequently, the correction value ζ is set to a value that corrects the error of the outer circumference L of the carry driving roller 53 that is caused by the protrusions and depressions in the high-friction resistance coating, and moreover the correction value ζ is set, depending on type of the recording paper P, to a value that corrects also the error in the carrying amount that is caused by the small amount of slippage between the surface of the carry driving roller 53 and the surface of the recording paper P. Thus, shifts in the carrying amount due to the small amount of slippage between the surface of the carry driving roller 53 and the surface of the recording paper P can be reduced. More specifically, it is a value determined by experiment or the like, and in the case of recording paper P in which the surface tends to slip and the carry amount shifts in an increasing direction, then a correction value ζ is set at which the outer diameter of the carry driving roller 53 is reduced, reducing the unit carrying amount d. In the case of a recording paper P in which the slipping of the surface is small and the carry amount shifts in a decreasing direction, then a correction value ζ is set at which the outer diameter of the carry driving roller 53 is increased, increasing the unit carrying amount d.

Thus, since it is possible to reduce shifts in the carrying amount due to the small amount of slippage that is caused between the surface of the carry driving roller 53 and the surface of the recording paper P, by setting the correction value ζ depending on the type of recording paper P, the error in the carrying amount due to the small amount of slippage that is caused between the surface of the carry driving roller 53 and the surface of the recording paper P can be compensated depending on the type of recording paper P.

Furthermore, an example of another embodiment is one in which, in addition to the embodiment described above, means that the user can arbitrarily set the unit carrying amount t is provided. For example, the user may set the unit carrying amount t as desired, according to the option settings or the like of the printer driver of a personal computer connected to an inkjet recording apparatus 50. Consequently, since the user can adjust the unit carrying amount while checking the recording quality, it becomes possible to, for example, comply with shifts in the carrying amount due to minuscule changes of the outer diameter of the carry driving roller 53 due to aging.

It should be noted that the present invention is not limited to the above working examples, and within the scope of the invention as defined in the patent claims, various modifications are possible, which are also included in the scope of the present invention.

As explained above, a further improvement in the recording image quality is made possible by a low-cost recording apparatus while leaving the outer diameter precision of the carry driving roller as it is, by controlling carrying of a recording paper with only small shifts in the recording paper carrying amount and without depending on the outer diameter precision of the carry driving roller.

What is claimed is:

1. A method of controlling carrying of recording paper for controlling recording paper carrying means of a recording apparatus comprising recording execution means for recording on a recording paper that has been carried into a recording execution area, said recording paper carrying means that has a carry driving roller being rotated by rotation driving force of a rotation driving power source and that is capable of carrying said recording paper in a predetermined direction toward said recording execution area, and carry driving roller rotation position detection means that includes a rotor provided with slits at equal intervals and slit detection means with which said slits can be detected, said method comprising the steps of:

calculating a unit carrying amount by dividing a circumference of an outer circumferential surface of said carry driving roller by a total number of said slits, said unit carrying amount being a carrying amount of the recording paper that corresponds to the interval of said slits;

calculating a quotient and a remainder carrying amount by dividing a recording paper carrying amount for which said recording paper is to be carried with said recording paper carrying means by said unit carrying amount;

causing said carry driving roller to rotate using said rotation driving power source until said slit detection means detects a number of said slits equal to said quotient; and adding said remainder carrying amount to said recording paper carrying amount for which said recording paper is to be carried for the next time.

2. A method of controlling carrying of recording paper according to claim 1, wherein in the step of calculating said unit carrying amount, said unit carrying amount is calculated by dividing the circumference of the outer circumferential surface of said carry driving roller by the total number of said slits after multiplying a correction value ζ to the circumference of the outer circumferential surface of said carry driving roller.

3. A method of controlling carrying of recording paper according to claim 2, wherein said correction value ζ is a correction value for correcting an error in the circumference due to protrusions and depressions in the outer circumferential surface of said carry driving roller.

4. A method of controlling carrying of recording paper according to claim 2, wherein said correction value $\zeta$ is a correction value being set to a value for correcting an error in the carrying amount that is caused by slippage occurring between the surface of said carry driving roller and the surface of said recording paper, and set depending on the type of the recording paper.

5. A method of controlling carrying of recording paper according to claim 1, further comprising a step in which said unit carrying amount is set arbitrarily by a user.

6. A recording apparatus comprising:

recording execution means for recording on a recording paper that has been carried into a recording execution area;

recording paper carrying means having a carry driving roller for carrying said recording paper in a predetermined direction toward said recording execution area by rotation driving force of a rotation driving power source;

carry driving roller rotation position detection means that includes a rotor provided with slits at equal intervals and slit detection means with which said slits can be detected;

unit carrying amount calculation means for calculating a unit carrying amount by dividing a circumference of an outer circumferential surface of said carry driving roller by a total number of said slits, said unit carrying amount being a carrying amount of the recording paper that corresponds to the interval of said slits;

recording paper carrying amount calculation means for calculating a quotient and a remainder carrying amount by dividing a recording paper carrying amount for which said recording paper is to be carried with said recording paper carrying means by said unit carrying amount;

rotation driving power source control means for causing said carry driving roller to rotate using said rotation driving power source until said slit detection means detects a number of said slits equal to said quotient; and remainder carrying amount adding means for adding said remainder carrying amount to said recording paper carrying amount for which said recording paper is to be carried for the next time.

7. A recording apparatus according to claim 6, wherein said unit carrying amount calculation means calculates said unit carrying amount by dividing the circumference of the outer circumferential surface of said carry driving roller by the total number of said slits after multiplying a correction value $\zeta$ to the circumference of the outer circumferential surface of said carry driving roller.

8. A recording apparatus according to claim 7, wherein said correction value $\zeta$ is a correction value for correcting an error in the circumference due to protrusions and depressions in the outer circumferential surface of said carry driving roller.

9. A recording apparatus according to claim 7, wherein said correction value $\zeta$ is a correction value being set to a value for correcting an error in the carrying amount that is caused by slippage occurring between the surface of said carry driving roller and the surface of said recording paper, and set depending on the type of the recording paper.

10. A recording apparatus according to claim 6, wherein said record carrying control device has unit carrying amount setting means with which a user can arbitraryly set said unit carrying amount.

11. A computer-readable storage medium recording threreon a recording paper carrying control program for causing a computer to execute a recording paper carrying control for a recording apparatus, said recording apparatus comprising recording execution means for recording on a recording paper that has been carried into a recording execution area, recording paper carrying means that has a carry driving roller for carrying said recording paper in a predetermined direction toward said recording execution area by rotation driving force of a rotation driving power source, and carry driving roller rotation position detection means that includes a rotor provided with slits at equal intervals and slit detection means with which said slits can be detected, said program causing a computer to execute the steps of:

calculating a unit carrying amount by dividing a circumference of an outer circumferential surface of said carry driving roller by a total number of said slits, said unit carrying amount being a carrying amount of the recording paper that corresponds to the interval of said slits;

calculating a quotient and a remainder carrying amount by dividing a recording paper carrying amount for which said recording paper is to be carried with said recording paper carrying means by said unit carrying amount;

causing said carry driving roller to rotate using said rotation driving power source until said slit detection means detects a number of said slits equal to said quotient; and adding said remainder carrying amount to said recording paper carrying amount for which said recording paper is to be carried for the next time.

12. A storage medium according to claim 11, wherein in the step of calculating said unit carrying amount, said unit carrying amount is calculated by dividing the circumference of the outer circumferential surface of said carry driving roller by the total number of said slits after multiplying a correction value $\zeta$ to the circumference of the outer circumferential surface of said carry driving roller.

13. A storage medium according to claim 12, wherein said correction value $\zeta$ is a correction value for correcting an error in the circumference due to protrusions and depressions in the outer circumferential surface of said carry driving roller.

14. A storage medium according to claim 12, wherein said correction value $\zeta$ is a correction value being set to a value for correcting an error in the carrying amount that is caused by slippage occurring between the surface of said carry driving roller and the surface of said recording paper, and set depending on the type of the recording paper.

15. A storage medium according to claim 11, further comprising a unit carrying amount setting step in which said unit carrying amount is set arbitrarily by a user.

16. A recording method for recording on a recording paper, comprising the steps of:

carrying said recording paper for a predetermined amount, based on a first carrying amount for which said recording paper is to be carried;

executing recording on said recording paper that has been carried for said predetermined amount;

executing an addition process of adding an amount obtained by subtracting said predetermined amount from said first carrying amount to a second carrying amount for which said recording paper is to be carried; and carrying said recording paper based on said second carrying amount to which said addition process has been executed.

17. A recording apparatus for recording on a recording paper, comprising:

recording paper carrying means for carrying said recording paper; and recording execution means for executing recording on said recording paper, wherein:

said recording paper carrying means carries said recording paper for a predetermined amount, based on a first carrying amount for which said recording paper is to be carried;

said recording execution means executes recording on said recording paper that has been carried for said predetermined amount; and said recording paper carrying means carries said recording paper based on an amount obtained by adding an amount obtained by subtracting said predetermined amount from said first carrying amount to a second carrying amount for which said recording paper is to be carried.

18. A recording apparatus for recording on recording paper, comprising:

a carry driving roller for carrying said recording paper; and a recording head for executing recording on said recording paper, wherein:

said carry driving roller carries said recording paper for a predetermined amount, based on a first carrying amount for which said recording paper is to be carried;

said recording head executes recording on said recording paper that has been carried for said predetermined amount; and said carry driving roller carries said recording paper based on an amount obtained by adding an amount obtained by subtracting said predetermined amount from said first carrying amount to a second carrying amount for which said recording paper is to be carried.

19. A method of controlling carrying of recording paper for controlling a carry driving roller of a recording apparatus comprising a recording head for recording on a recording paper that has been carried into a recording execution area, said carry driving roller that is rotated by rotation driving force of a rotation driving power source and that is capable of carrying said recording paper in a predetermined direction toward said recording execution area, a rotor that is provided with slits at equal intervals, and a slit detector with which said slits can be detected, said method comprising the steps of:

calculating a unit carrying amount by dividing a circumference of an outer circumferential surface of said carry driving roller by a total number of said slits, said unit carrying amount being a carrying amount of the recording paper that corresponds to the interval of said slits;

calculating a quotient and a remainder carrying amount by dividing a recording paper carrying amount for which said recording paper is to be carried with said carry driving roller by said unit carrying amount;

causing said carry driving roller to rotate using said rotation driving power source until said slit detector detects a number of said slits equal to said quotient; and adding said remainder carrying amount to said recording paper carrying amount for which said recording paper is to be carried for the next time.

20. A recording apparatus comprising:

a recording head for recording on a recording paper that has been carried into a recording execution area;

a carry driving for carrying said recording paper in a predetermined direction toward said recording execution area by rotation driving force of a rotation driving power source;

a rotor provided with slits at equal intervals;

a slit detector with which said slits can be detected;

a unit carrying amount calculator for calculating a unit carrying amount by dividing a circumference of an outer circumferential surface of said carry driving roller by a total number of said slits, said unit carrying amount being a carrying amount of the recording paper that corresponds to the interval of said slits;

a recording paper carrying amount calculator for calculating a quotient and a remainder carrying amount by dividing a recording paper carrying amount for which said recording paper is to be carried with said recording paper carrying means by said unit carrying amount;

a rotation driving power source controller for causing said carry driving roller to rotate using said rotation driving power source until said slit detector detects a number of said slits equal to said quotient; and a remainder carrying amount adder for adding said remainder carrying amount to said recording paper carrying amount for which said recording paper is to be carried for the next time.

* * * * *